Patented Oct. 21, 1924.

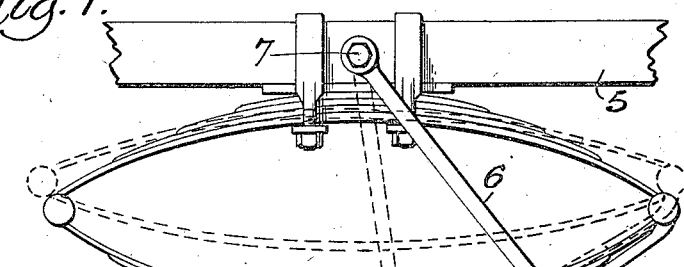
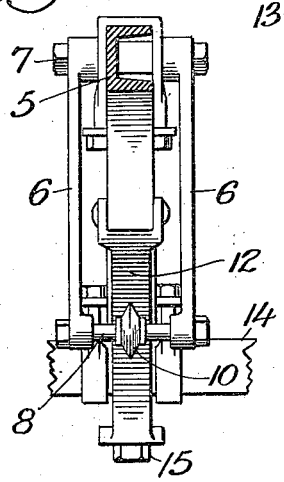
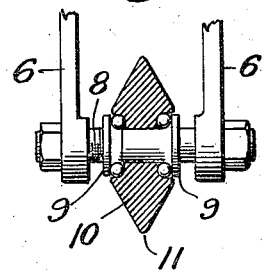
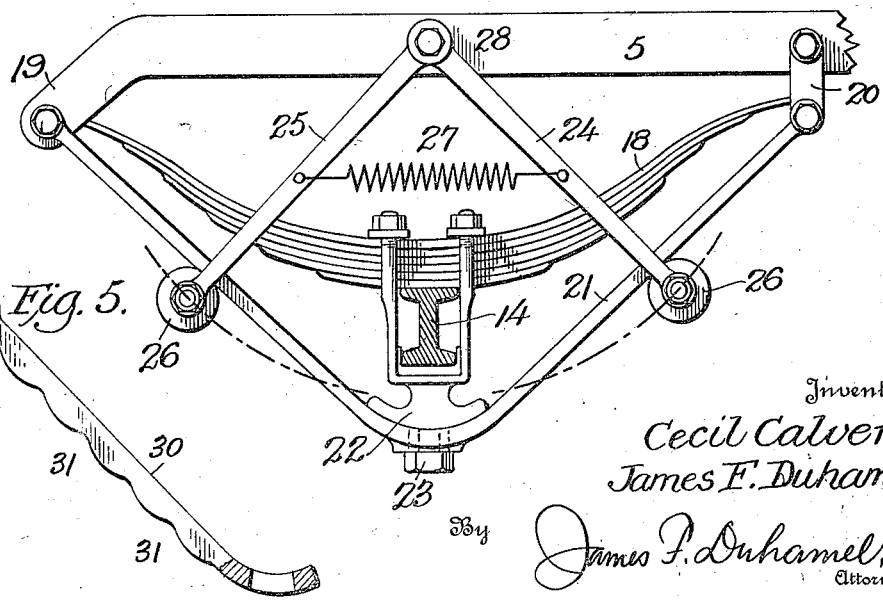

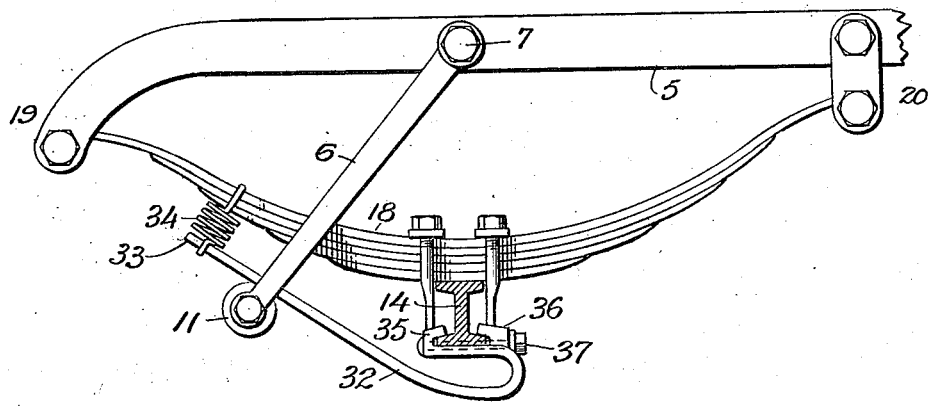
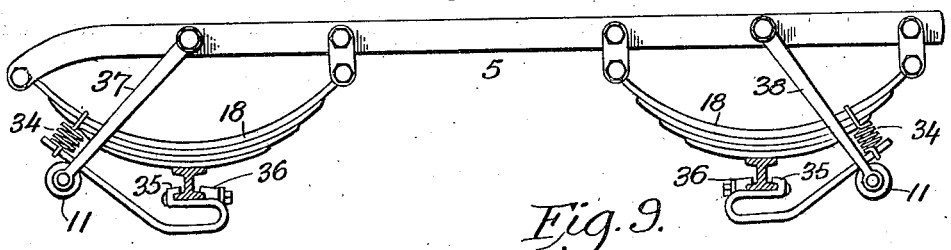
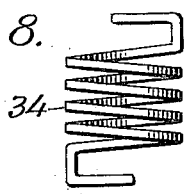
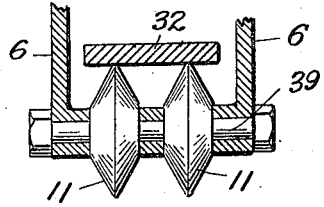
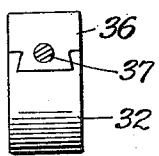

1,512,455

UNITED STATES PATENT OFFICE.

CECIL CALVERT AND JAMES F. DUHAMEL, OF WASHINGTON, DISTRICT OF COLUMBIA.

SHOCK ABSORBER.

Application filed May 11, 1921. Serial No. 468,513.

*To all whom it may concern:*

Be it known that we, CECIL CALVERT and JAMES F. DUHAMEL, both residents of Washington, District of Columbia, and citizens of the United States, have invented certain new and useful Improvements in Shock Absorbers, of which the following is a specification.

This invention relates to shock absorbers and its object is to provide vehicle springs with a swinging arm or yoke with means to engage the lower side of a leaf spring or plate thereon as the said spring is compressed and to prevent the instant relaxation or rebound of the spring to its normal position and shape. The said lever or yoke is hung from the body of the vehicle and preferably provided with some engaging means as a roller, to run over an inclined and undulating plate on the lower side of the spring and the lever or yoke is free to change its location when the distance between the axle and body of the vehicle is decreased.

These and other objects and details of the invention are more fully described in the following specification, set forth in the claims and illustrated in the accompanying drawings, wherein:

Fig. 1 is a side elevation of an elliptical spring showing the invention applied thereto.

Fig. 2 is an end view of the same.

Fig. 3 is a detail view of the engaging roller.

Fig. 4 is a modified form of the invention employing duplicate yokes.

Fig. 5 is a side elevation of a modified form of travel plate for the roller.

Fig. 6 is a modified form of the shock absorber.

Fig. 7 is another modified form of the device showing its adaptation to each end of the vehicle to prevent horizontal thrusts of the vehicle body.

Fig. 8 is a detail view of the compression spring for the bearing plate.

Fig. 9 is a cross sectional view through the end of the levers, the rollers and the bearing plate.

Fig. 10 is the end view of the bearing plate shown in Fig. 6.

The device is adapted to be applied to all springs where a jolt or a jar causes a vertical compression and where the same may be applied by pivoting certain parts to the body of the vehicle and allowed to swing as the spring is compressed or released.

To the frame 5 of the vehicle is pivoted a yoke comprising the arms 6 adapted to swing on the bolt 7 and carrying at their lower ends the spindle 8 having ball bearing cones 9 and on which is supported the roller 10 having an outer bearing edge 11 that is free to travel over a plate 12.

The spring 13 shown in Figs. 1 and 2, is secured in the usual manner to the vehicle frame at its upper side and to the axle 14 at its lower side. The plate 12 is forked at its upper end and secured to the outer end of the spring while its lower end is slotted for the passage of a bolt 15 which also retains an encircling spring 16 so that there shall be a certain freedom of action by the plate when the spring is compressed. A small spring 17 is also interposed between the plate 12 and the spring 13.

As will be seen by the dotted lines in Fig. 1, when the spring is thus compressed, the arms 6 drop by gravity and assume an almost vertical position, the centre of the roller 10 travelling on the dotted arc line.

When the arms of the yoke are thus located the roller 10 bears upon the lower end of the plate and on the rebound of the spring the lost play of the plate is first taken up by the springs 16 and 17 when the pressure of the spring 13 is now thrown entirely upon the yoke and roller 10 which now begins to travel up the inclined plane or undulating surface of the plate and appreciably retards the return of the spring.

In Fig. 4 is shown a modified form of absorber as may be applied to a motor truck and where the ends of the spring 18 are carried by the end 19 of the chassis and the shackle 20. A strap 21 may also be secured at each of these points and carried over a saddle 22 beneath the axle, having a slot for the passage of a bolt 23 and to allow a certain amount of play as the spring 18 is compressed. Two yokes with arms 24 and 25 are here provided and have the roller 26 which travels over the inclined plate or strap 21 as the spring 18 is compressed and the distance from the beam 5 and the axle 14 is decreased, and otherwise acting as above described.

Where two yokes are thus used it will be found advisable to unite the yokes together and overcome any friction that may be caused at the pivot 28 by rust, dirt or ice to check it.

If a spring is used whose rebound carries the roller 10 up the plate 12 too suddenly, the plate may be made as shown in Fig. 5 where the plate 30 is corrugated on its lower side, the undulations 31 serving to retard the movement of the roller and prevent too sudden upward movement of the spring and outward swing of the yoke.

A plate 32 of limited length is shown in Fig. 6 and does not connect with the outer end of the spring 18 but has a free end 33 that is supported by the coil spring 34 with hook ends to encircle the spring 18 and the plate. This coil spring is shown enlarged in Fig. 8.

The plate 32 is secured to the axle 14 by means of the jaws 35 and 36, the latter being removable and dovetailed in the end of the plate as shown in Fig. 10, while the jaws are clamped to the axle by the bolt 37.

In Fig. 7 the absorber is shown as applied to the springs at each end of the chassis and illustrating how the horizontal thrust of the latter may be controlled by this invention. It is a well known fact that the bulk of the vibrations and movements of a vehicle body on its springs results from the sudden check of its momentum by obstructions encountered by the wheels. When the latter strikes a rock or a depression and is momentarily checked the tendency of the heavy car body is to continue onward and considerable swaying and jolting follows.

The levers 37 and 38 being set at opposite angles will tend to impede these longitudinal thrusts and restrain the movements of the car to the vertical only, or locking it between the rollers of the two levers.

A modified form of roller 11 is shown in Fig. 9 where twin rollers are seen on the same spindle 39 and have cutting edges to break up mud or ice as they move along the bearing plate.

It is obvious that the yokes and rollers may be otherwise arranged and modified without departing from the essential features above described or from the scope of the appended claims.

What we claim as new is:

1. In a shock absorber, the combination of a spring, and means pivoted above the said spring and retained in a partly elevated position near the outer end of the spring but adapted to fall by gravity beneath the spring when the latter is compressed and to be again forced to the outer end of the spring when it relaxes.

2. In a shock absorber, the combination of a spring, and means hung above the spring and normally supported at its outer end but adapted to drop by gravity beneath the spring when the latter is compressed and confine it against rapid rebound when released.

3. In a shock absorber, the combination of a spring, and means hung above the said spring and adapted to drop under the same when compressed and confine it against rapid rebound when released.

4. In a shock absorber, the combination of a spring, and pivoted means hung above the spring and adapted to drop by gravity beneath the spring when the latter is compressed but retard its relaxing.

5. In a shock absorber, the combination of a spring having an inclined plate on its lower side, a yoke pivoted above the spring, and means carried at the lower end of the yoke and adapted to travel over the plate.

6. In a shock absorber, the combination of a vehicle frame, a spring beneath same, a yoke pivoted to the frame and adapted to straddle the spring, a plate loosely held beneath the spring, and a roller journalled in the lower end of the yoke and adapted to move along the plate as the spring operates.

7. In a shock absorber, the combination of a vehicle frame, a spring beneath same, a yoke comprising arms pivoted in the frame and adapted to straddle the spring, an inclined plate hinged at its outer end of the spring and secured beneath said spring, a spindle journalled in the lower ends of the yoke and uniting the same, and a roller on the spindle to travel over the pate.

8. In a shock absorber, the combination of a vehicle frame, a spring supporting same, an inclined corrugated plate beneath the spring, a yoke pivoted to the frame, and a roller in the lower end of the yoke and adapted to travel over the plate as the spring is compressed and released.

9. In a shock absorber, the combination of a vehicle body, a spring supporting the same, an inclined plate carried beneath the spring, and means hung from the said vehicle body and adapted to move down the inclined plate by gravity when the spring is compressed but retard its rebound when the spring is released.

10. In a shock absorber, the combination of a spring supporting a vehicle body, means pivoted on the vehicle body and adapted to swing towards a vertical line and under the spring as it is compressed, and means adapted to return the pivoted means to its normal position when the spring is relaxed.

11. In a shock absorber, the combination of a spring supporting a vehicle body, an axle carrying the spring, means pivoted above said spring and adapted to drop towards a vertical line and under the spring when it is compressed, and means carried by the axle and adapted to force the pivoted means to its normal position when the spring is relaxed.

12. In a shock absorber, the combination of a spring adapted to support a vehicle body, an axle carrying the spring, an inclined plate carried by the axle and beneath the lower side of the spring, and means pivoted to the body of the vehicle and adapted to travel down the inclined plate by gravity when the spring is compressed and be forced up the same when the spring rebounds.

In testimony whereof we hereunto affix our signatures.

CECIL CALVERT.
JAMES F. DUHAMEL.